US012581386B2

(12) United States Patent
Katsuragi

(10) Patent No.: US 12,581,386 B2
(45) Date of Patent: Mar. 17, 2026

(54) COMMUNICATION APPARATUS, CONTROL METHOD OF COMMUNICATION APPARATUS, AND COMPUTER-READABLE STORAGE MEDIUM

(71) Applicant: CANON KABUSHIKI KAISHA, Tokyo (JP)

(72) Inventor: Tetsuya Katsuragi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 18/335,857

(22) Filed: Jun. 15, 2023

(65) Prior Publication Data

US 2023/0337085 A1 Oct. 19, 2023

Related U.S. Application Data

(63) Continuation of application No. PCT/JP2021/038878, filed on Oct. 21, 2021.

(30) Foreign Application Priority Data

Dec. 17, 2020 (JP) ................................ 2020-209554

(51) Int. Cl.
*H04W 40/22* (2009.01)
*H04W 36/00* (2009.01)
(Continued)

(52) U.S. Cl.
CPC ..... *H04W 36/305* (2018.08); *H04W 36/0058* (2018.08); *H04W 36/087* (2023.05)

(58) Field of Classification Search
CPC ........... H04W 36/305; H04W 36/0058; H04W 36/087; H04W 76/19; H04W 76/30;
(Continued)

(56) References Cited

U.S. PATENT DOCUMENTS

2003/0124976 A1* 7/2003 Tamaki ................ H04B 7/2606
455/15
2016/0249183 A1* 8/2016 Kim ........................ H04W 4/06
(Continued)

FOREIGN PATENT DOCUMENTS

JP 2017526281 A 9/2017
JP 2019534625 A 11/2019
(Continued)

OTHER PUBLICATIONS

ZTE et al., Discussion on inter-Donor IAB Node Migration procedure, 3GPP TSG-RAN WG3 Meeting #110-e, R3-206559, Nov. 2-12, 2020.
(Continued)

*Primary Examiner* — Charles N Appiah
(74) *Attorney, Agent, or Firm* — Canon U.S.A., Inc. IP Division

(57) ABSTRACT

A communication apparatus that functions as a node that relays a link between a user equipment and a base station, comprises: determination unit configured to determine whether or not to switch a base station to which the user equipment is connected via the communication apparatus, from a first base station to a second base station, in a state where the user equipment is RRC (Radio Resource Control)-connected to the first base station via the communication apparatus; and requesting unit configured to, in a case where the determination unit determines that the base station to which the user equipment is connected is to be switched to the second base station, transmit a handover request message that includes information regarding a cell identifier for the second base station, to the user equipment.

8 Claims, 7 Drawing Sheets

(51) Int. Cl.
*H04W 36/08* (2009.01)
*H04W 36/30* (2009.01)

(58) Field of Classification Search
CPC . H04W 88/04; H04W 92/18; H04W 36/0055;
H04W 40/22; H04W 76/27; H04W
88/085; H04W 40/36
See application file for complete search history.

(56) References Cited

U.S. PATENT DOCUMENTS

| | | | |
|---|---|---|---|
| 2022/0014976 A1* | 1/2022 | Luo | H04W 36/0044 |
| 2022/0141749 A1 | 5/2022 | Luo | |
| 2022/0322174 A1* | 10/2022 | Da Silva | H04W 76/19 |

FOREIGN PATENT DOCUMENTS

| | | | | |
|---|---|---|---|---|
| WO | 2016048620 A1 | 3/2016 | | |
| WO | 2018063892 A1 | 4/2018 | | |
| WO | WO-2019093790 A1 * | 5/2019 | | H04W 36/0085 |
| WO | 2019246446 A1 | 12/2019 | | |
| WO | 2020164564 A1 | 8/2020 | | |
| WO | 2020164569 A1 | 8/2020 | | |
| WO | 2020191768 A1 | 10/2020 | | |
| WO | WO-2020202402 A1 * | 10/2020 | | H04W 40/20 |
| WO | WO-2021092301 A1 * | 5/2021 | | H04W 36/0061 |

OTHER PUBLICATIONS

CATT. (TP for NR_IAB BL CR for TS 38.401) Inter-CU IAB-node migration. 3GPP TSG RAN WG3 #105 R3-193475 [online]. Aug. 30, 2019 [retrieval date Jan. 6, 2022], Internet URL:https://www.3gpp.org/ftp/tsg_ran/WG3_lu/TSGR3_105/Docs/R3-193475.zip. pp. 1-9.

Intel Coporation. Discussion on HO requirements of NR-U. 3GPP TSG RAN WG4 #92 R4-1908242 [online]. Aug. 30, 2019 [retrieval date Jan. 6, 2022], Internet URL:https://www.3gpp.org/ftp/tsg_ran/WG4_Radio/TSGR4_92/Docs/R4-1908242.zip. pp. 1-11.

Huawei. HiSilicon. Discussion on physical cell id for CHO configurations. 3GPP TSG RAN WG2 #111-e R2-2008011 [online]. Aug. 28, 2020 [retrieval date Jan. 6, 2022], Internet URL:https://www.3gpp.org/ftp/tsg_ran/WG2_RL2/TSGR2_111-e/Docs/R2-2008011.zip. pp. 1-3.

* cited by examiner

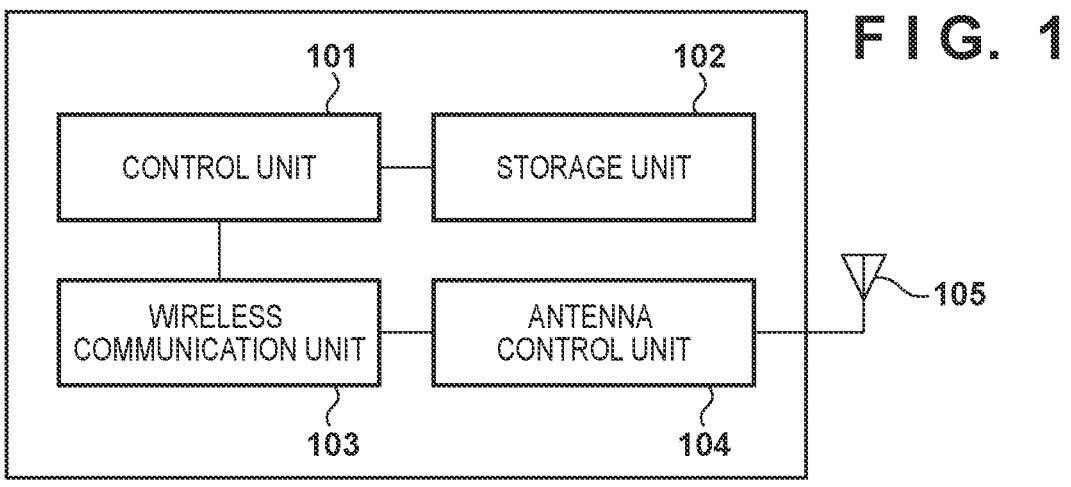
F I G. 1
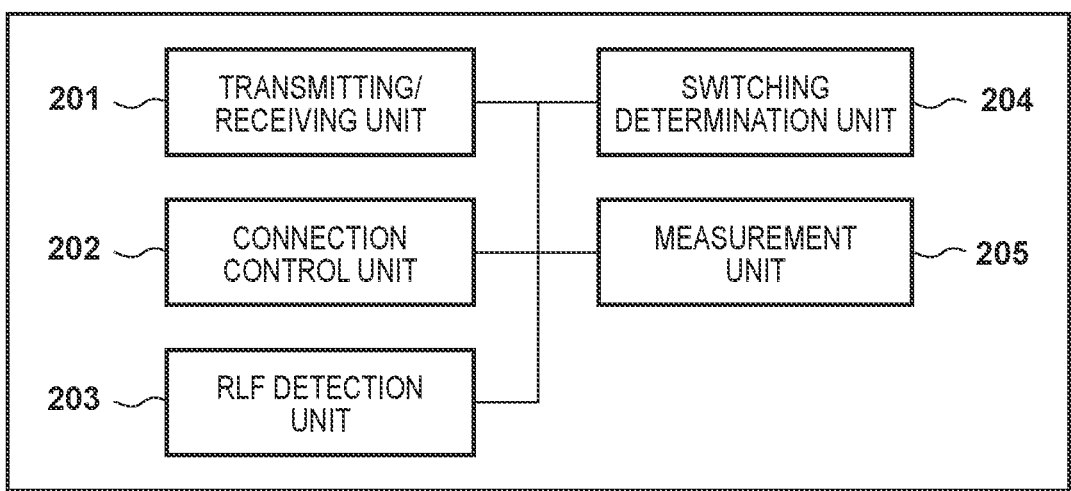
F I G. 2A
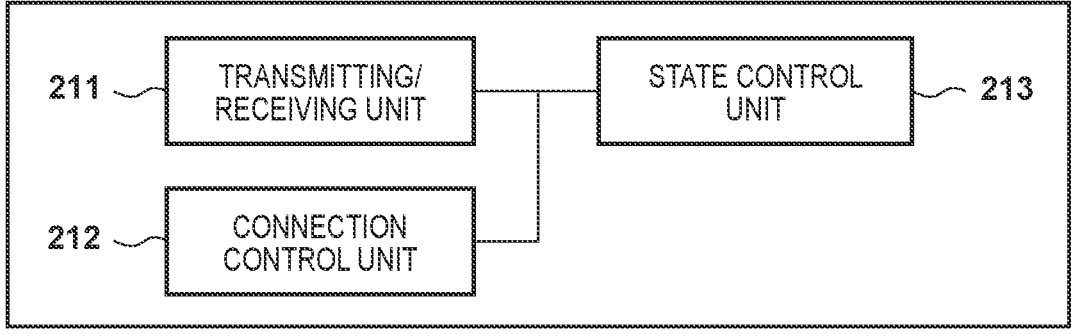
F I G. 2B

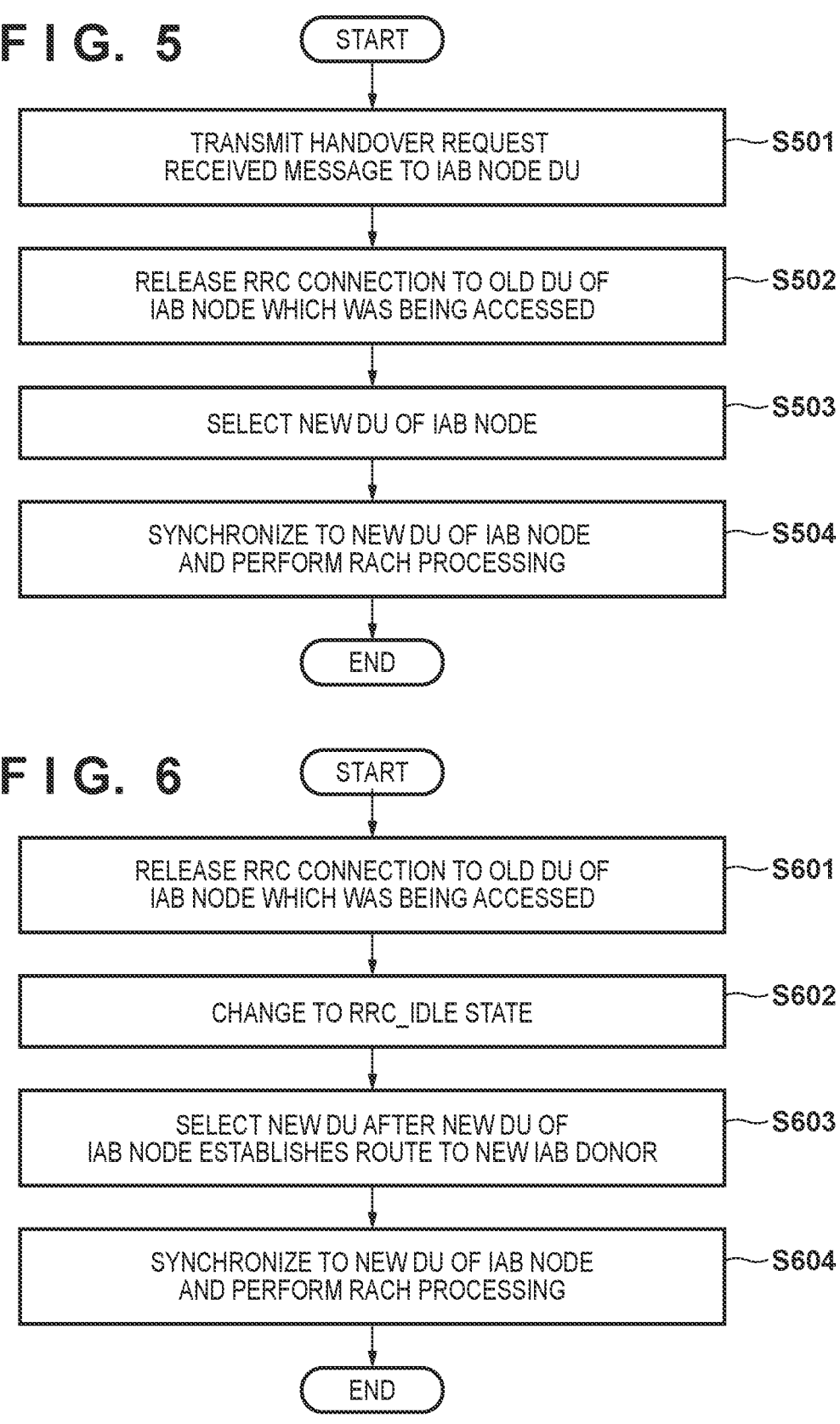

FIG. 5

START

TRANSMIT HANDOVER REQUEST
RECEIVED MESSAGE TO IAB NODE DU — S501

RELEASE RRC CONNECTION TO OLD DU OF
IAB NODE WHICH WAS BEING ACCESSED — S502

SELECT NEW DU OF IAB NODE — S503

SYNCHRONIZE TO NEW DU OF IAB NODE
AND PERFORM RACH PROCESSING — S504

END

FIG. 6

START

RELEASE RRC CONNECTION TO OLD DU OF
IAB NODE WHICH WAS BEING ACCESSED — S601

CHANGE TO RRC_IDLE STATE — S602

SELECT NEW DU AFTER NEW DU OF
IAB NODE ESTABLISHES ROUTE TO NEW IAB DONOR — S603

SYNCHRONIZE TO NEW DU OF IAB NODE
AND PERFORM RACH PROCESSING — S604

END

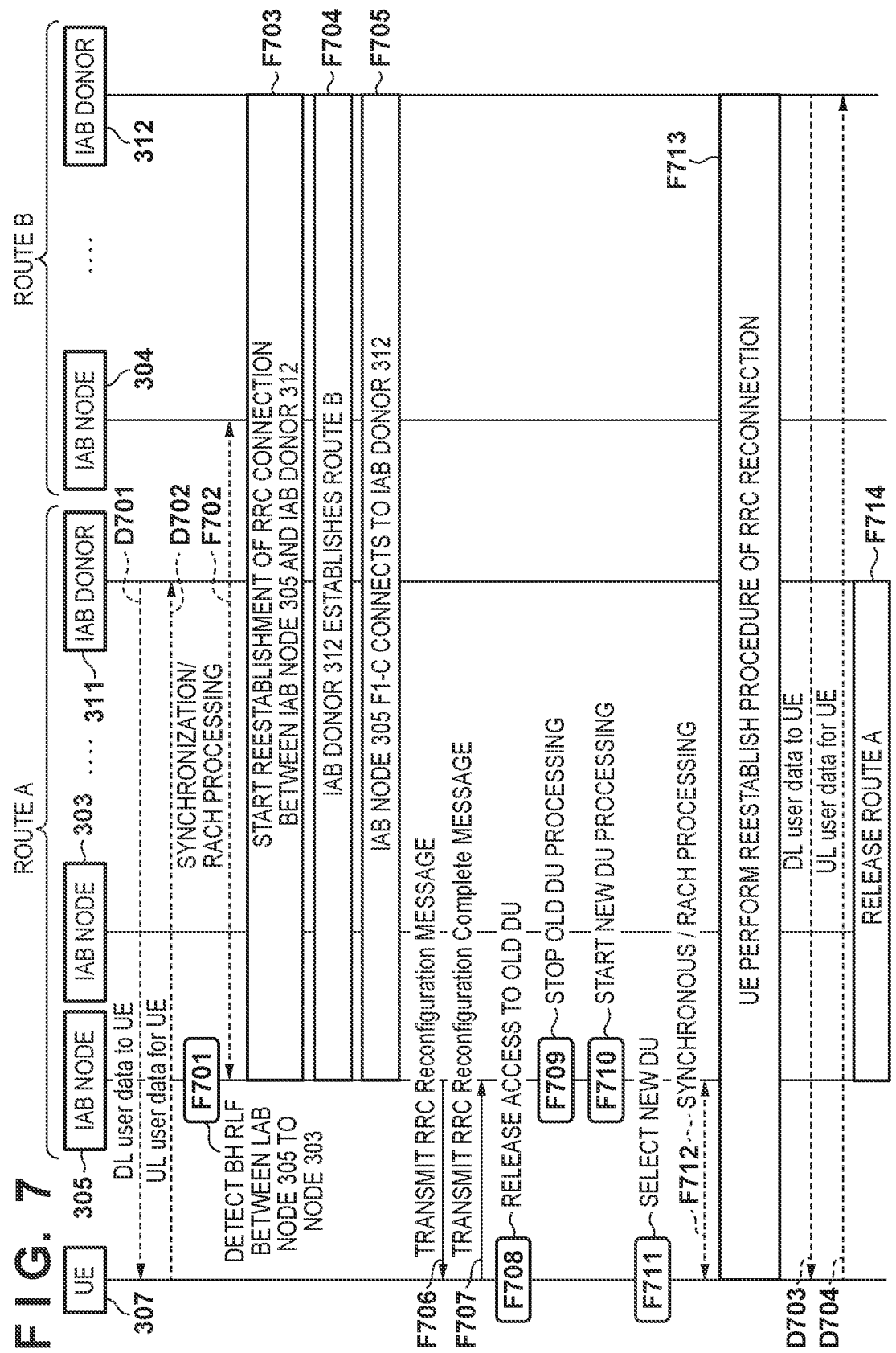
F I G. 7

COMMUNICATION APPARATUS, CONTROL METHOD OF COMMUNICATION APPARATUS, AND COMPUTER-READABLE STORAGE MEDIUM

CROSS-REFERENCE TO RELATED APPLICATIONS

This application is a Continuation of International Patent Application No. PCT/JP2021/038878, filed on Oct. 21, 2021, which claims the benefit of Japanese Patent Application No. 2020-209554, filed on Dec. 17, 2020, both of which are hereby incorporated by reference herein in their entireties.

BACKGROUND OF THE INVENTION

Field of the Invention

The present invention relates to a wireless communication technique.

Background Art

In 3GPP (3rd Generation Partnership Project), standardization of IAB (Integrated Access and Backhaul) has been developed as a communication technique for backhaul. The IAB technique is a technique for using millimeter-wave wireless communication on the 28 GHz band or the like that is used for access communication between a base station and a UE (User Equipment), as backhaul communication at the same time (Patent Literature 1). In backhaul communication that uses the IAB technique, a relay device called an "IAB node" relays, using millimeter-wave communication, communication performed by an IAB donor that is a base station. By using the IAB technique, it is possible to extend the area coverage at a low cost compared with wired communication performed using conventional optical fibers.

There may be cases where, when the IAB technique is used, a radio link failure occurs in backhaul communication (BH RLF (Backhaul Radio Link Failure)), and communication is suspended due to connection between IAB nodes being disconnected. When BH RLF occurs, an IAB node can recover communication by switching connection to another IAB node to which the IAB node can be connected, and reestablishing backhaul communication. In addition, also due to a cause other than the occurrence of BH RLF, a case can occur in which a route that has been already established needs to be changed due to the influence from a reduction in the quality of communication between IAB nodes. Patent Literature 2 discloses a procedure of a handover that is performed from one base station to another base station by a user equipment, and enables more efficient use of spectrum.

CITATION LIST

Patent Literature

PTL1: Japanese Patent Laid-Open No. 2019-534625
PTL2: Japanese Patent Laid-Open No. 2017-526281
When an IAB node switches another IAB node to which the IAB node is connected, the IAB node may be connected to an IAB node connected to an IAB donor (new IAB donor) different from an IAB donor (old IAB donor) to which the IAB node was connected until the switching. In that case, the IAB node stops a DU (Distributed Unit) in operation that was connected to the old IAB donor, and newly starts the DU for connection to the new IAB donor. The newly started DU establishes connection to the new IAB donor, and recovers communication.

On the other hand, a UE connected to the IAB node detects disconnection from the IAB node due to the DU of the IAB node being stopped, and then starts an RLF detection timer. After the RLF detection timer has expired, the UE changes the RRC (Radio Resource Control) state to "RRC_IDLE", and starts processing for reconnection to the IAB node in order to reestablish connection to the IAB node.

Here, let us consider a case in which the RLF detection timer of the UE expires before the IAB node establishes connection to the new IAB donor. In this case, the UE starts to search for a base station, but the IAB node is not ready to communicate with the new IAB donor and has not resumed a base station function, and thus the UE cannot find the IAB node. For this reason, the UE attempts connection to a base station that the UE could find and is different from the IAB node, or the UE is connected to a connectable base station. In such a case, there has been an issue that, even when the IAB node establishes connection to the new IAB donor and resumes the base station function, it can take time for the UE to be reconnected to the IAB node. That is to say, there has been an issue that the UE cannot promptly resume data communication after the IAB node has completed switch of an IAB donor to which the IAB node is connected, and the user friendliness reduces.

SUMMARY OF THE INVENTION

The present invention has been made in view of the aforementioned issue, and an object of the present invention is to provide a technique for promptly resuming communication from the occurrence of a radio link failure.

As means for achieving the aforementioned object, a communication apparatus according to one embodiment of the present invention has the following configuration. That is to say, the communication apparatus that functions as a node that relays a link between a user equipment and a base station, comprises: determination unit configured to determine whether or not to switch a base station to which the user equipment is connected via the communication apparatus, from a first base station to a second base station, in a state where the user equipment is RRC (Radio Resource Control)-connected to the first base station via the communication apparatus; and requesting unit configured to, in a case where the determination unit determines that the base station to which the user equipment is connected is to be switched to the second base station, transmit a handover request message that includes information regarding a cell identifier for the second base station, to the user equipment.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a block diagram showing an exemplary hardware configuration of a communication apparatus.

FIG. 2A is a block diagram showing an exemplary functional configuration of the communication apparatus.

FIG. 2B is a block diagram showing an exemplary functional configuration of the communication apparatus.

FIG. 5 is a flowchart showing processing that is executed by a UE that has received a handover request.

FIG. 6 is a flowchart showing processing that is executed by a UE that has received an RRC connection release request.

FIG. 7 is a communication sequence according to the first embodiment.

DESCRIPTION OF THE EMBODIMENTS

Figure 3:
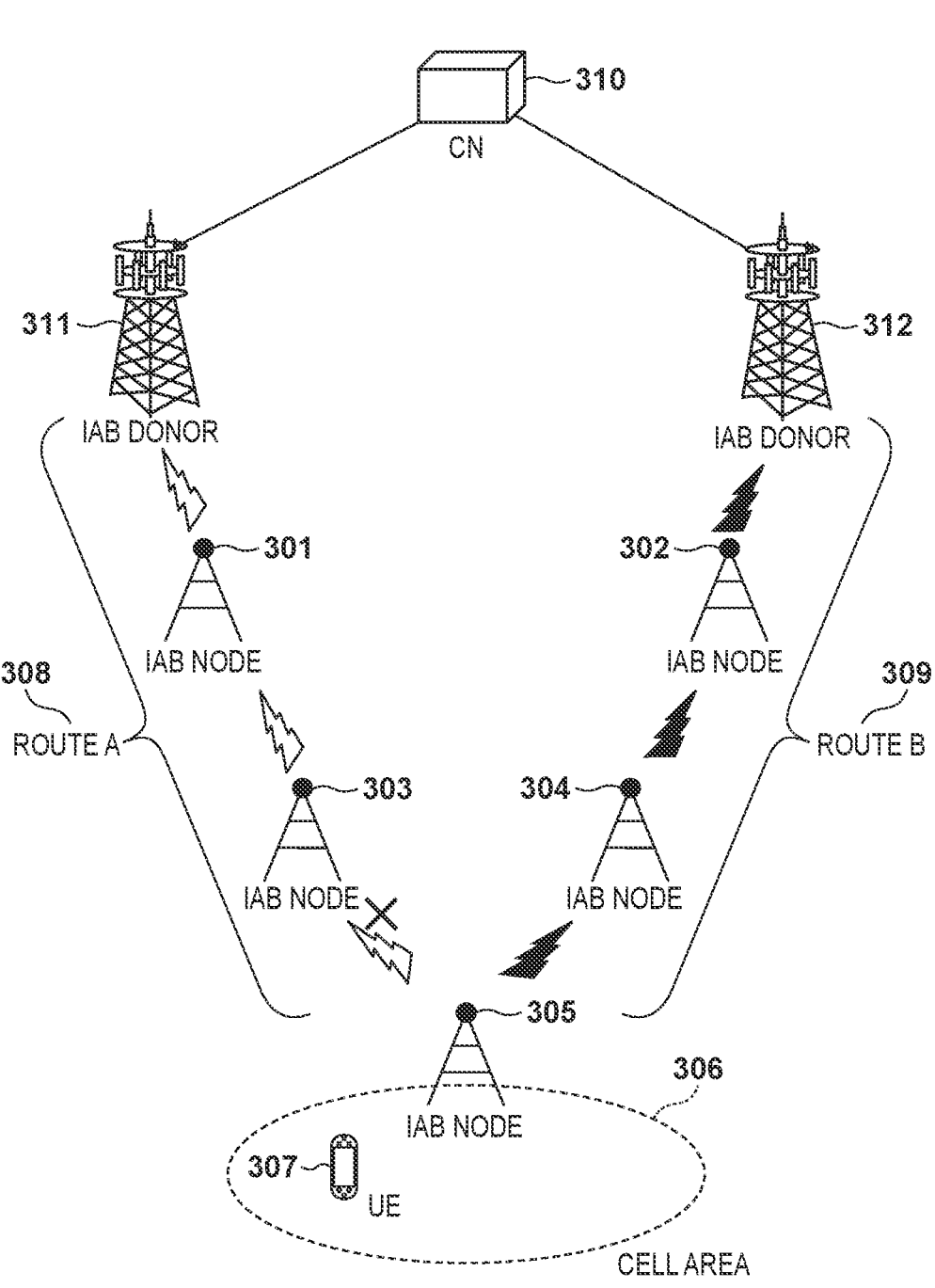
FIG. 3 shows a configuration example of a communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment (Configuration of Communication System)

FIG. 3 shows a configuration example of a communication system according to the present embodiment. Nodes 301, 302, 303, 304, and 305 are wireless base stations that operate as IAB (Integrated Access and Backhaul) nodes, and nodes 311 and 312 are wireless base stations that operate as IAB donors. Each IAB node can support an NR (New Radio) access link to a UE in a 5G (5th Generation) mobile communication system, and an NR backhaul link to a parent node or a child node.

A UE (User Equipment) 307 is positioned in a cell area 306 that is covered (managed) by the IAB node 305, and can be connected to the IAB node 305. In the present embodiment, each IAB donor manages a backhaul network path (adaptation layer route). In FIG. 3, for example, the IAB donor 311 manages a route A308 extending to the UE 307 and constituted by the IAB nodes 301, 303, and 305. Also, the IAB donor 312 manages a route B 309 extending to the UE 307 and constituted by the IAB nodes 302, 304, and 305.

In addition, routing tables that include routing information are set in the respective nodes on each of the routes, and the routing tables are set by the IAB donor. Note that the routing information can include a destination address, a next hop node to which a packet is transferred, a BH (Backhaul) link or a BH RLC (Radio Link Control) channel, and a cost measurement reference. In FIG. 3, one of the IAB nodes on each route is connected to the IAB donor, and the IAB donor is connected to a CN (Core Network) 310.

In FIG. 3, when BH RLF (Backhaul Radio Link Failure) occurs between the IAB node 305 and the IAB node 303 that are subordinate to the IAB donor 311, the IAB node 305 needs to switch the IAB node (parent node) to which the IAB node 305 is connected. The IAB node 305 detects the IAB node 304 that is an adjacent cell, sets a new backhaul link, and establishes a new route B 309 (the IAB donor 312, the IAB node 302, the IAB node 304, and the IAB node 305). At this time, the IAB donor that establishes a route to the IAB node 305 is switched from the IAB donor 311 to the IAB donor 312. For this reason, the IAB node 305 and all of the UEs connected to the IAB node 305, which include the UE 307, require handover processing, and, furthermore, when an IAB node is connected downstream of the IAB node 305, this downstream IAB node and all of the UEs connected to this downstream node require handover processing.

In order to perform a handover, the IAB node 305 stops a DU (Distributed Unit) thereof that is in operation and has been connected to an IAB donor (the IAB donor 311), and newly starts the DU for connection to a new IAB donor (the IAB donor 312). The IAB node 305 and the IAB donors are controlled as follows. The IAB donor 311 and the IAB node 305 are connected via other IAB nodes using F1-C association and F1-U tunnel, but, when a new route is established due to BH RLF, the IAB donor 312 and the IAB node 305 are connected to each other using new F1-C association and F1-U tunnel. Due to this processing, connection destination of the DU of the IAB node 305 is updated from the IAB donor 311 to the IAB donor 312. The IAB donor 312 updates the routing information as a result of establishing a new route, and thus the IP addresses of the IAB nodes are updated.

(Configuration of Communication Apparatus)

FIG. 1 is a block diagram showing an exemplary hardware configuration of a communication apparatus (UE (user equipment), an IAB node) according to the present embodiment. In FIG. 1, a control unit 101 controls the entire communication apparatus by executing a control program stored in a storage unit 102. The storage unit 102 stores a control program that is executed by the control unit 101, and various types of information such as cell information (base station information), connection terminal information, and IAB routing information. Various operations to be described later can be performed by the control unit 101 executing control programs stored in the storage unit 102. A wireless communication unit 103 performs control for performing cellular network communication of LTE (Long Term Evolution), 5G, or the like that complies with the 3GPP (3rd Generation Partnership Project) standard. Note that the wireless communication unit 103 may be configured to perform control for performing communication that complies with the standard of IEEE802.11 series. An antenna control unit 104 controls an antenna 105 for wireless communication that is performed by the wireless communication unit 103. A plurality of antennas 105 may be provided in order to realize MIMO (Multi-Input Multi-Output) communication or the like.

FIGS. 2A and 2B are block diagrams showing exemplary functional configurations of the communication apparatus (UE (user equipment), IAB node) according to the present embodiment. FIG. 2A shows an exemplary functional configuration of the IAB node. In FIG. 2A, a transmitting/receiving unit 201 transmits/receives a message (frame/packet) to/from a communication partner apparatus via the wireless communication unit 103, the antenna control unit 104, and the antenna 105 (FIG. 1). In addition, the transmitting/receiving unit 201 may perform message generating processing (when transmitting a message) and message analyzing processing (when receiving a message). A connection control unit 202 controls connection to the communication partner apparatus. The connection control unit 202 can make a request to establish/release connection to the communication partner apparatus, for example, via the transmitting/receiving unit 201. An RLF detection unit 203 detects (senses) a wireless failure on a physical layer that occurs between the communication apparatus and the communication partner apparatus. A switching determination unit 204 performs determination on switching of the IAB donor to which the communication apparatus is connected, in accordance with a change in a communication route. A measurement unit 205 measures (derives) the strength and/or quality of a signal received from the communication partner apparatus (RSSI (Received Signal Strength Indicator/Indication), RSRQ (Reference Signal Received Quality), RSRP (Reference Signal Received Power), SINR (Signal-to-Interference Noise Ratio), and the like), and generates a measurement report.

FIG. 2B shows an exemplary functional configuration of the UE. In FIG. 2B, a transmitting/receiving unit 211 transmits/receives a message (frame/packet) to/from a communication partner apparatus via the wireless communication unit 103, the antenna control unit 104, and the antenna 105 (FIG. 1). In addition, the transmitting/receiving unit 211 may perform message generating processing (when transmitting a message) and message analyzing processing (when receiving a message). A connection control unit 212 controls connection to the communication partner apparatus. The connection control unit 212 can make a request to establish/release connection to the communication partner apparatus, for example, via the transmitting/receiving unit 211. A state control unit 213 performs control of states that includes a state change of the UE.

(Processing that is Performed by IAB Node)

Figure 4:
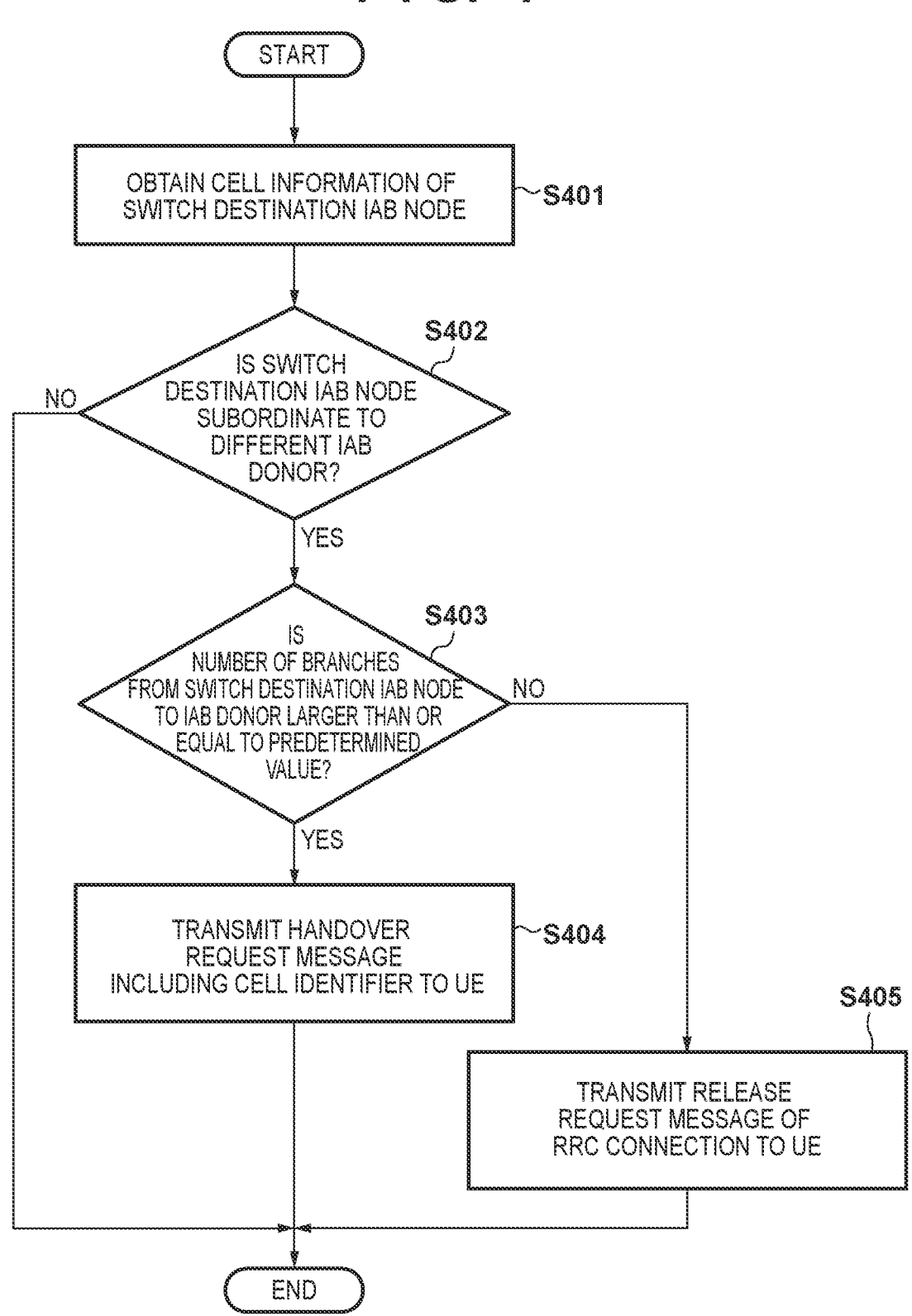
FIG. 4 is a flowchart showing processing that is executed by an IAB node according to a first embodiment.

Next, processing that is performed by an IAB node in accordance with whether or not an IAB donor is switched will be described. FIG. 4 is a flowchart showing processing that is executed by the IAB node according to the present embodiment. Here, such processing will be described as processing that is executed by the IAB node 305 in a communication system such as that shown in FIG. 3. In addition, assume that the IAB node 305 is RRC (Radio Resource Control)-connected to the UE 307.

When the RLF detection unit 203 of the IAB node 305 detects BH RLF between the IAB node 305 and the IAB node 303, the connection control unit 202 changes the IAB node (parent node) to which the IAB node is connected. Here, the connection control unit 202 of the IAB node 305 establishes synchronization with the IAB node 304 that is a new parent node (switch destination IAB node), performs RACH (Random Access Channel) processing between the IAB node 305 and the new parent node, and is connected to the new parent node. The transmitting/receiving unit 201 of the IAB node 305 then obtains cell information from the IAB node 304 (step S401). The IAB node 305 obtains a PCI (Physical Cell Indicator) included in a notification signal transmitted from the IAB node 304, for example (note that, in the following description, the PCI can be referred to as a "cell identifier"). The switching determination unit 204 of the IAB node 305 then compares the obtained PCI with a PCI, namely the cell information that has been obtained already from the IAB node 303. Based on the comparison, the switching determination unit 204 of the IAB node 305 determines whether or not the IAB donor to which the parent node is connected is switched (route/cell changes) before and after the parent node is changed. That is to say, determination is performed as to whether or not the IAB node that is a switch destination is subordinate to an IAB donor different from the IAB donor before the switching.

If, for example, it is determined that the PCIs match, and the IAB node that is a switch destination is subordinate to the same IAB donor before the switching (No in step S402), the connection control unit 202 determines that the IAB donor is not switched, and ends the procedure. On the other hand, if it is determined that, for example, the PCIs do not match, and the IAB node that is a switch destination is subordinate to an IAB donor different from the IAB donor before the switching (Yes in step S402), the procedure advances to step S403.

In step S403, the transmitting/receiving unit 201 of the IAB node 305 obtains, from the IAB node 304, information regarding the number of branches (the number of relays) from the IAB node 304 that is a switch destination IAB node to the IAB donor 312 that is a new IAB donor. That is to say, the transmitting/receiving unit 201 of the IAB node 305 obtains information regarding the number of branches in nodes from the IAB node 305 to the IAB donor (new IAB donor) to which the IAB node 305 is to be connected, between which data is relayed. Note that the information regarding the number of branches may be provided from the IAB node 304, or may be derived by the IAB node 305 based on information provided from a node such as the IAB node 304. The connection control unit 202 of the IAB node 305 then determines whether or not the number of branches is larger than or equal to a predetermined value (step S403).

If the number of branches is larger than or equal to the predetermined value (Yes in step S403), the connection control unit 202 transmits a handover request message that includes the cell identifier, to the UE 307 via the transmitting/receiving unit 201 (step S404). Note that, when there are one or more nodes/UEs connected to the IAB node 305 under the control of the IAB node 305, the handover request message can be transmitted to the one or more nodes/UEs. The handover request message can be transmitted to all of the UEs connected to the IAB node 305, which include the UE 307, and, when an IAB node is connected downstream of the IAB node 305, the handover request message can be transmitted to the downstream IAB node and all of the UEs connected to the downstream node, for example. In addition, the handover request message may be transmitted using an RRC Reconfiguration message standardized in a 3GPP specification, or may be transmitted using an originally generated handover request message.

On the other hand, if the number of branches is smaller than the predetermined value (No in step S403), the connection control unit 202 transmits an RRC connection release request message to the UE 307 via the transmitting/receiving unit 201 (step S405). Note that, when there are one or more nodes/UEs connected to the IAB node 305 under the control of the IAB node 305, the release request message can be transmitted to the one or more nodes/UEs. The release request message can be transmitted to all of the UEs connected to the IAB node 305, which include the UE 307, and, when an IAB node is connected downstream of the IAB node 305, the release request message can be transmitted to the downstream IAB node and all of the UEs connected to the downstream IAB node, for example. In addition, the release request message may be transmitted using an RRC Release message standardized in a 3GPP specification, or may be transmitted using an originally generated release request message. In addition, a list of frequencies at which connection is preferentially made may be added to the release request message. Accordingly, the UE after connection is released can be connected with priority given to a frequency set in the frequency list. In addition, in a case of having established connection to the new IAB donor (in the example in FIG. 3, the IAB donor 312) after transmitting the RRC connection release request message to the UE 307 and the like, the connection control unit 202 of the IAB node 305 may notify the UE 307 that connection to the new IAB donor has been established, via the transmitting/receiving unit 201 using a lower layer.

Note that a configuration may be adopted in which the processing of step S403 is omitted, and the procedure advances to step S404 or S405 if a determination of Yes is made in step S402. In addition, the condition in step S405 may be replaced with another condition for determining that handover is to be performed.

Processing that is performed by the UE 307 that has received the handover request message that includes the cell identifier and processing that is performed by the UE 307 that has received the RRC connection release request message will be described later with reference to FIGS. 5 and 6, respectively.

(Processing that is Performed by UE)

Next, processing that is performed by the UE when the IAB donor is switched will be described. Here, such processing will be described as processing that is executed by the UE 307 in a communication system such as that shown in FIG. 3. In addition, assume that the UE 307 is RRC-connected to the IAB node 305.

Note that, in the following description, a DU of the IAB node 305 for connection to an old IAB donor is referred to as an "old DU", and a DU for connection to a new IAB donor is referred to as a "new DU". In addition, the UE can be changed from an RRC_IDLE state that is a stand-by state to an RRC_CONNECTED state (can be RRC-connected to a base station), by reusing context information.

FIG. 5 is a flowchart showing processing that is executed when the UE 307 receives a handover request message when the IAB donor is switched. This processing can be started by the UE 307 receiving the handover request message transmitted by the IAB node 305 in step S404 in FIG. 4.

Upon receiving the handover request message that includes the cell identifier, the transmitting/receiving unit 211 of the UE 307 transmits, to the old DU of the IAB node 305, a message indicating that the message has been received (handover request received message) (step S501). Next, the connection control unit 212 of the UE 307 releases RRC connection to the old DU of the IAB node 305 to which the UE 307 had access (step S502). The handover request message received by the transmitting/receiving unit 211 includes the cell identifier, and thus the connection control unit 212 of the UE 307 promptly selects the new DU of the IAB node 305 (step S503). Subsequently, the connection control unit 212 establishes synchronization with the new DU, and performs RACH processing (step S504).

FIG. 6 is a flowchart showing processing that is executed when the UE 307 receives an RRC connection release request message when the IAB donor is switched. The processing can be started by the UE 307 receiving the RRC connection release request message transmitted by the IAB node 305 in step S405 in FIG. 4.

When the transmitting/receiving unit 211 of the UE 307 receives the RRC connection release request message from the IAB node 305, the connection control unit 212 releases RRC connection to the old DU of the IAB node 305 to which the UE 307 had access (step S601). After RRC connection is released, the state control unit 213 of the UE 307 changes the state of the UE 307 from the RRC_CONNECTED state to the RRC_IDLE state that is an IDLE stand-by state (step S602). The UE is in the stand-by state, and thus maintains the stand-by state, for example, until power received from a base station (in this example, an IAB node) satisfies a certain reference value. As will be described later with reference to FIG. 8, while the UE is in the RRC_IDLE state, the IAB node 305 starts F1-C connection to the IAB donor 312 that is a new IAB donor, using a DU setup procedure (F705 in FIG. 7). When the connection is established, connection between the new DU of the IAB node 305 and the IAB donor 312 is completed, and thus the new DU of the IAB node 305 becomes ready to access the UE 307.

After connection between the new DU of the IAB node 305 and the IAB donor 312 is completed, the connection control unit 212 of the UE 307 is in the RRC_IDLE state, and thus promptly detects (discovers) the new DU of the IAB node 305 without any problem occurring in wireless communication unit, and selects the new DU of the IAB node 305 (step S603). The connection control unit 212 of the UE 307 then establishes synchronization with the new DU of the IAB node 305, and performs RACH processing (step S604). Note that a configuration may be adopted in which, when the transmitting/receiving unit 211 of the UE 307 receives, from the IAB node 305, notification that connection to a new IAB donor (in the example in FIG. 3, the IAB donor 312) has been established, the UE 307 performs processing of steps S503 and S504.

(Communication Sequence in Communication System)

FIG. 7 is a communication sequence diagram according to the present embodiment. Assume that the UE 307 is RRC-connected on the route A. The UE 307 performs data communication with the IAB donor 311 via the route A (D701, D702). When a wireless failure on a physical layer is detected between the IAB node 305 and the IAB node 303, the IAB node 305 starts a timer. If the IAB node 305 does not recover from the failure within a timer time (predetermined time) after the timer was started, the IAB node 305 detects BH RLF, and makes a declaration thereof (F701).

The IAB node 305 loses the parent node that is a connection destination, due to a backhaul wireless failure, but establishes synchronization and performs RACH processing, and is connected to the IAB node 304 that is a new parent node (F702). Establishment of synchronization and RACH processing are similar to a procedure in which a normal UE finds a connection destination cell through cell search, and is connected to the cell.

The IAB node 305 starts to reestablish RRC connection (RRC-Connection-Reestablishment) to the IAB donor 312 that is a new IAB donor (F703). Accordingly, the IAB donor 312 establishes the new route B to the IAB node 305 via the IAB node 302 and the IAB node 304 (F704). Subsequently, the IAB node 305 starts F1-C connection to the IAB donor 312 in accordance with a DU setup procedure (F705). As a result, connection between the new DU of the IAB node 305 and the IAB donor 312 is completed, and thus the new DU of the IAB node 305 becomes ready to access the UE 307. In addition, in the processing performed to this point, the IAB node 305 obtains information regarding the number of branches from the IAB node 304 to the IAB donor 312, and the number of branches is larger than or equal to the predetermined value (Yes in step S403 in FIG. 4).

The IAB node 305 transmits a handover request message that includes a cell identifier, to the UE 307 using an RRC Reconfiguration message (F706). The cell identifier can be included in a CellGroupConfig element. The UE 307 transmits a handover request received message to the IAB node 305 using an RRC Reconfiguration Complete message (F707). The UE 307 executes processing for releasing access (RRC connection) to the old DU of the IAB node 305 (F708).

Next, the IAB node 305 stops old-DU processing for connection to the IAB donor 311 (F709), and starts new-DU processing for connection to the IAB donor 312 (F710). At this time, the IAB node 305 may notify the UE 307 that the new-DU processing has been started. The UE 307 detects (finds) the new DU of the IAB node 305 based on information regarding the cell identifier included in the handover request message, and selects the new DU (F711). The UE 307 then establishes synchronization with the IAB node 305, and performs RACH processing (F712). The UE 307 then executes processing for reestablishing RRC connection to the IAB donor 312 (F713). When the processing for reestablishing RRC connection is completed, the UE 307 can resume data communication with the IAB donor 312 (D703, D704).

Thereafter, the IAB donor 311 releases the route A that is an old adaptation layer route via the IAB node 303 and the IAB node 301, on the wireless backhaul between the IAB node 305 and the IAB donor 311. Furthermore, the IAB donor 311 releases forwarding entry between fronthauls on the old route on the wireless backhaul (F714).

As described above, according to the present embodiment, when BH RLF is detected, the IAB node 305 establishes connection on a new route (connection with new IAB donor), then transmits, to the UE 307, the handover request message that includes the cell identifier, and stops DU processing. On the other hand, the UE 307 can perform processing for releasing access to the DU of the IAB node 305, and can then promptly start connection to the IAB node 305, based on the cell identifier included in the received handover request message. As a result, compared with a conventional method, after occurrence of BH RLF, the UE 307 can be more promptly connected to an IAB node, and can resume data communication.

Second Embodiment

Next, a second embodiment will be described. A configuration of a communication system and configurations of communication apparatuses according to the present embodiment are similar to those according to the first embodiment, and thus a description thereof is omitted.
(Processing that is Performed by IAB Node)

Figure 8:
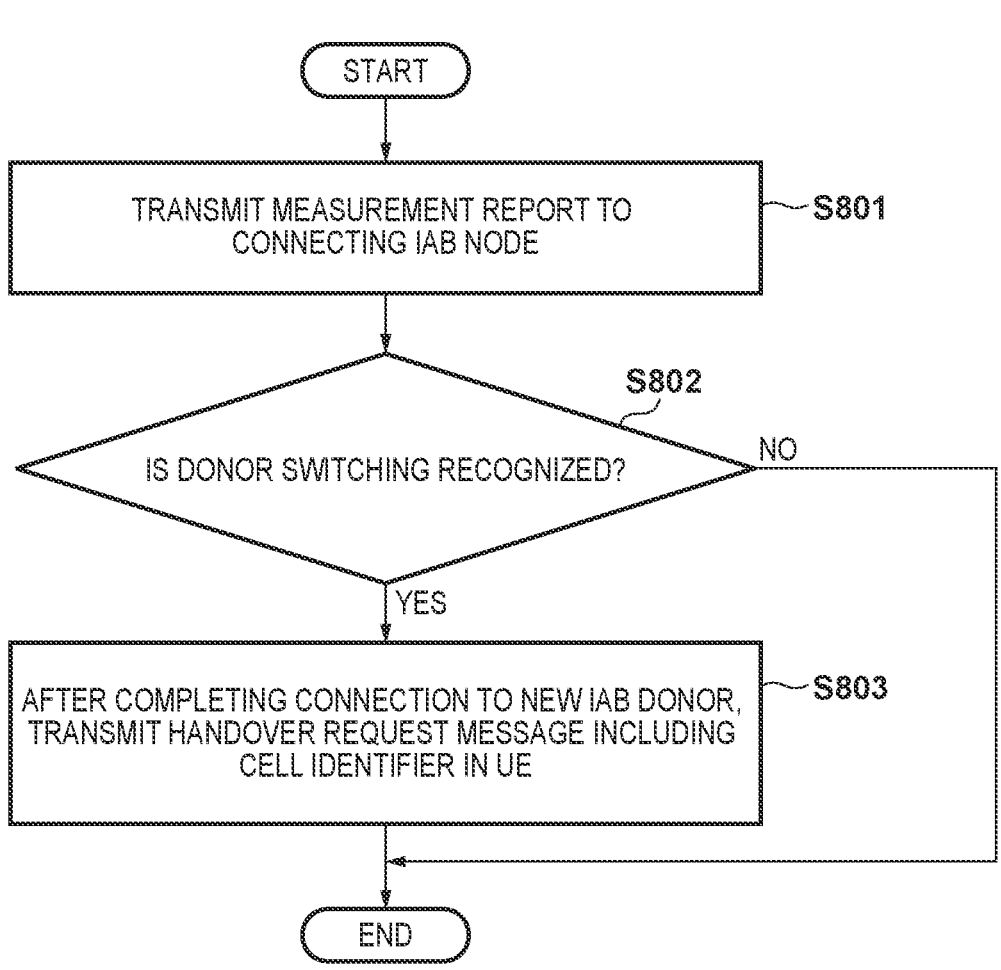
FIG. 8 is a flowchart showing processing that is executed by an IAB node according to a second embodiment.

Processing that is performed by an IAB node in accordance with whether or not an IAB donor is switched will be described. FIG. 8 is a flowchart showing processing that is executed by the IAB node according to the present embodiment. Here, such processing will be described as processing that is executed by the IAB node 305 in a communication system such as that shown in FIG. 3.

The measurement unit 205 of the IAB node 305 measures the strength and/or quality of a received signal (RSSI and the like). Subsequently, the transmitting/receiving unit 201 of the IAB node 305 transmits a measurement report message that includes information regarding the measurement (measurement information), to the IAB node 303 that is an IAB node (parent node) to which the IAB node 305 is connected (step S801). The transmitted measurement report is used by the IAB donor 311 for determination as to whether or not to perform a handover from the IAB donor 311 to the IAB donor 312. If it is determined that a handover is to be performed, based on the measurement report, the IAB donor 311 transmits an RRC Reconfiguration message to the IAB node 305 via the IAB node 303. The above processing will be described later with reference to FIG. 9.

If switching of the IAB donor is recognized by receiving the RRC Reconfiguration message from the IAB node 303 via the transmitting/receiving unit 201 (Yes in step S802), the switching determination unit 204 of the IAB node 305 determines that the IAB donor is to be switched, and the procedure advances to step S803. In step S803, after connection to the new IAB donor is completed, the IAB node 305 transmits a handover request message that includes a cell identifier, to the UE 307. Note that the handover request message can be transmitted to all of the UEs connected to the IAB node 305, which include the UE 307, and, when an IAB node is connected downstream of the IAB node 305, the handover request message can be transmitted to the downstream IAB node and all of the UEs connected to the downstream IAB node. In addition, the handover request message may be transmitted using an RRC Reconfiguration message standardized in a 3GPP specification, or may be transmitted using an originally generated handover request message.

On the other hand, if the IAB node 305 does not recognize switching of the IAB donor, for example, due to the RRC Reconfiguration message not being received within a predetermined time (No in step S802), the IAB node 305 ends the processing.
(Processing that is Performed by UE)
Processing that is performed by a UE when an IAB donor is switched is similar to the processing described in the first embodiment and shown in FIG. 5, and thus a description thereof is omitted.
(Communication Sequence in Communication System)

Figure 9:
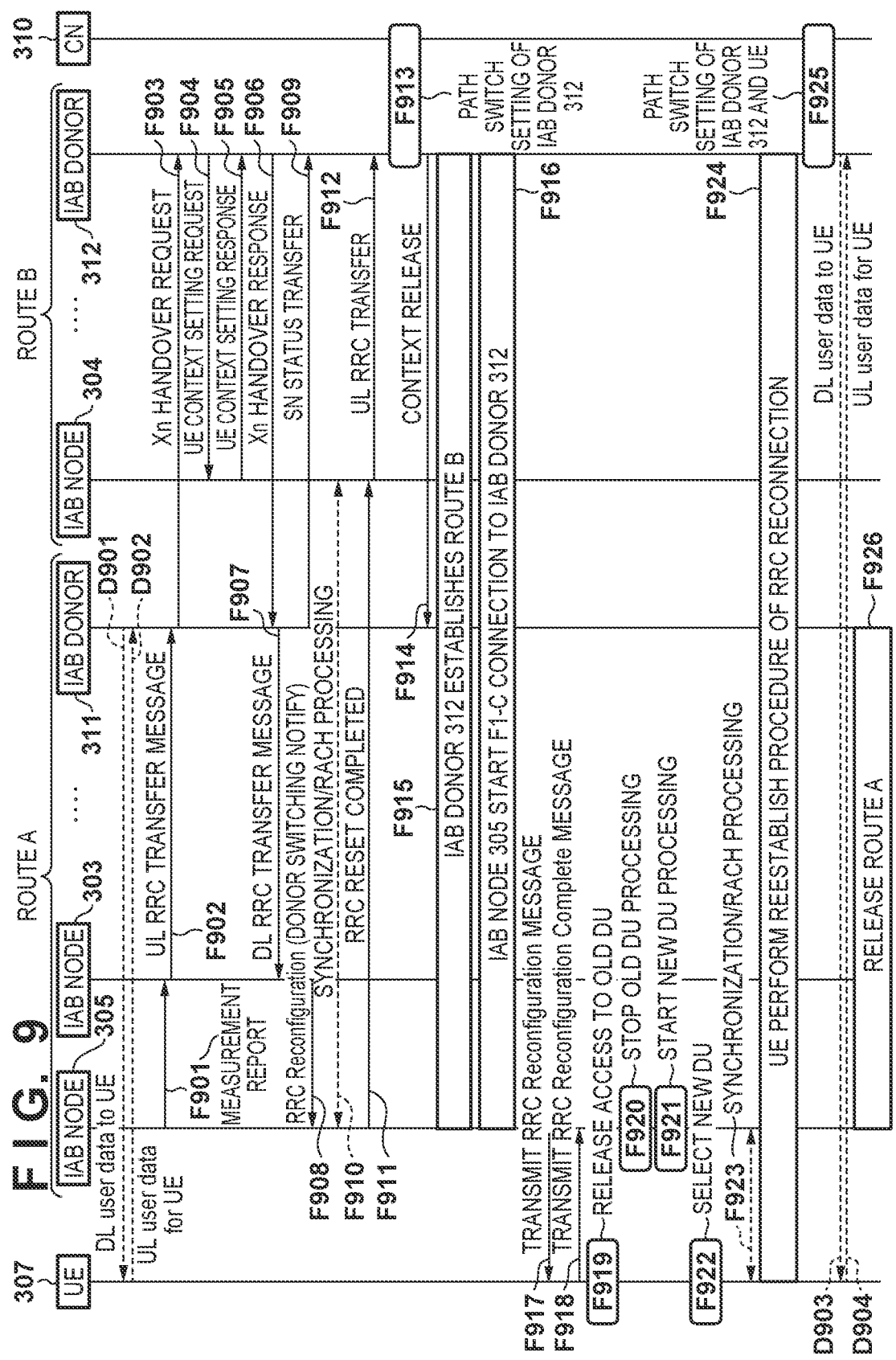
FIG. 9 is a communication sequence according to the second embodiment.

FIG. 9 is a communication sequence diagram according to the present embodiment. Assume that the UE 307 is RRC-connected on the route A. The UE 307 performs data communication with the IAB donor 311 via the route A (D901, D902). The IAB node 305 transmits, to the IAB node 303, a measurement report message that includes measurement information such as RSSI (F901). The measurement report message may be transmitted at a predetermined timing, may be periodically transmitted, or may be transmitted in accordance with a request from the IAB node 303. Subsequently, the IAB node 303 transmits the received measurement report message to the IAB donor 311 using an RRC transfer message (F902).

The IAB donor 311 checks whether or not a link failure has occurred, and the like, based on the measurement report received from the IAB node 305, and determines whether or not to perform a handover from the IAB node 303 to the IAB node 304. If it is determined that a handover is to be performed, the IAB donor 311 transmits an Xn handover request message to the IAB donor 312, and starts handover preparation. In addition, handover preparation is performed for all of the access UEs and IAB nodes (F903). The IAB donor 312 transmits a UE context setup (setting) request message to the target IAB node 304, creates MT (Mobile Termination (one function on an IAB node)) context, and sets one or more bearers (F904). The IAB node 304 responds to the IAB donor 312 using a UE context setup response message (F905). The IAB donor 312 responds to the IAB donor 311 using an Xn handover request response message (F906).

The IAB donor 311 transmits a UE context change request message to the IAB node 303. This message includes an RRC Reconfiguration message generated for MT of the IAB node 305 (F907). The IAB node 303 transfers the received RRC Reconfiguration message to the IAB node 305.

The IAB node 305 recognizes (determines) that the IAB donor is to be switched to another IAB donor (F908), based on the received RRC Reconfiguration message. In addition, the IAB donor 311 transmits an SN status transfer message to the IAB donor 312 (F909).

The IAB node 305 detects the IAB node 304, establishes synchronization, and performs RACH processing (F910). Subsequently, the IAB node 305 transmits an RRC Reconfiguration Complete message to the IAB node 304 (F911). The DU of the IAB node 304 transfers an RRC Reconfiguration Complete message to the IAB donor 312 through UL RRC transfer (F912). The IAB donor 312 executes a path switching procedure for the CN 310 and the IAB node 305 (F913). After the path switching procedure is completed, the IAB donor 312 transmits a context release request message to the IAB donor 311 (F914).

The IAB donor 312 sets a new adaptation layer route on the wireless backhaul between the IAB donor 312 and the IAB node 305 that is switched via the target IAB node 304. As a result, the new route B is established (F915). The DU on the IAB node 305 starts new F1*-C connection to the IAB donor 312 (F916). As a result, a DU service is resumed, and thus a new DU of the IAB node 305 becomes ready to access the UE 307. In addition, in the processing performed to this point, the IAB node 305 obtains information regarding the number of branches from the IAB node 304 to the IAB donor 312, and the number of branches is larger than or equal to the predetermined value (Yes in step S403 in FIG. 4).

The IAB node 305 transmits an RRC Reconfiguration message as a handover request message that includes a cell identifier to the UE 307 (F917). The cell identifier can be included in a CellGroupConfig element. The UE 307 transmits an RRC Reconfiguration Complete message as a handover request received message to the IAB node 305 (F918). The UE 307 executes processing for releasing access (RRC connection) to the old DU of the IAB node 305 (F919).

Next, the IAB node 305 stops old-DU processing for connection to the IAB donor 311 (F920), and starts new-DU processing for connection to the IAB donor 312 (F921). The UE 307 selects the new DU of the IAB node 305 based on the information regarding the cell identifier included in the handover request message (F922). The UE 307 then establishes synchronization with the IAB node 305, and performs RACH processing (F923). The UE 307 then performs processing for reestablishing RRC connection (F924). The IAB donor 312 execute path switching of the UE 307 using the CN 310 (F925). The UE 307 can then resume data communication with the IAB donor 312 (D903, D904). The processing of F926 is similar to the processing of F714 in FIG. 7, and thus a description thereof is omitted.

As described above, according to the present embodiment, if it is determined that the IAB donor is to be switched based on measurement information obtained by the IAB node 305, the IAB node 305 establishes connection to a new IAB donor. Next, the IAB node 305 transmits, to the UE 307, a handover request message that includes a cell identifier, and stops DU processing. On the other hand, the UE 307 performs processing for releasing access to the DU of the IAB node 305, and can then promptly start connection to the IAB node 305, based on the cell identifier included in the received handover request message. As a result, the UE 307 can be more promptly connected to the IAB node in accordance with a change in the wireless state, and can resume data communication.

According to the present invention, a technique for promptly resuming communication from the occurrence of a radio link failure is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that functions as a node that relays a link between a user equipment and a base station, comprising:

at least one memory and at least one processor, wherein the at least one memory and the at least one processor are configured to:

determine whether or not to switch a base station to which the user equipment is connected via the communication apparatus, from a first base station to a second base station, in a state where the user equipment is RRC (Radio Resource Control)-connected to the first base station via the communication apparatus; and in a case where the base station to which the user equipment is connected is to be switched to the second base station is determined, transmit a handover request message that includes information regarding a cell identifier for the second base station, to the user equipment, wherein, in a case where a number of branches in nodes that relay data between the communication apparatus and the second base station is larger than or equal to a predetermined value, transmit, to the user equipment, a handover request message that includes information regarding the cell identifier for the second base station.

2. The communication apparatus according to claim 1, wherein the at least one memory and the at least one processor are further configured to:

detect a radio link failure (RLF) between the communication apparatus and another communication apparatus, namely a first communication apparatus that functions as a node at a first link between the first base station and the communication apparatus;

when the RLF is detected, establish connection with yet another communication apparatus, namely a second communication apparatus that functions as a node at a second link that is different from the first link; and obtain, from the second communication apparatus, information regarding a cell identifier for a base station to which the second communication apparatus is connected, after connection with the second communication apparatus is established, wherein, in a case where the information regarding the cell identifier obtained is information regarding a cell identifier for the second base station, determine that the base station to which the user equipment is connected is to be switched to the second base station.

3. The communication apparatus according to claim 1, wherein the at least one memory and the at least one processor are further configured to:

create a measurement report indicating strength and/or quality of a received signal measured at a link between the communication apparatus and the first base station;

transmit the measurement report to the first base station; and receive a reconfiguration message from the first base station in response to the measurement report being transmitted, wherein, when it is recognized, based on the reconfiguration message, that the base station to which the user equipment is connected is to be switched to the second base station, determine that the base station to which the user equipment is connected is to be switched to the second base station.

4. The communication apparatus according to claim 1, wherein the at least one memory and the at least one processor are further configured to:

transmit the handover request message using an RRC reconfiguration message.

5. The communication apparatus according to claim 4, wherein in the handover request message, the cell identifier for the second base station is included in an CellGroupConfig element.

6. The communication apparatus according to claim 1, wherein the at least one memory and the at least one processor are further configured to:

when there are a plurality of other communication apparatuses that are connected to the communication apparatus under control of the communication apparatus, transmit the handover request message to the other communication apparatuses.

7. The communication apparatus according to claim 1, wherein the at least one memory and the at least one processor are further configured to:

in a case where the number of branches is smaller than the predetermined value, transmit, to the user equipment, a message requesting that RRC connection with the communication apparatus is to be released.

8. The communication apparatus according to claim 7, wherein the at least one memory and the at least one processor are further configured to:

when there are a plurality of other communication apparatuses connected to the communication apparatus under control of the communication apparatus, transmit the RRC connection release request message, to the plurality of other communication apparatuses.

* * * * *